(No Model.)

C. A. HATCH.
CAR FENDER.

No. 583,146. Patented May 25, 1897.

Witnesses
Nannie E. Nait.
Arthur B. Jenkins.

Inventor
Charles A. Hatch.
By Chas. L. Burdett,
Attorney.

THE NORRIS PETERS CO., PHOTO-LITHO., WASHINGTON, D. C.

UNITED STATES PATENT OFFICE.

CHARLES A. HATCH, OF HARTFORD, CONNECTICUT.

CAR-FENDER.

SPECIFICATION forming part of Letters Patent No. 583,146, dated May 25, 1897.

Application filed October 8, 1896. Serial No. 608,266. (No model.)

*To all whom it may concern:*

Be it known that I, CHARLES A. HATCH, a citizen of the United States, and a resident of Hartford, in the county of Hartford and State of Connecticut, have invented certain new and useful Improvements in Car-Fenders, of which the following is a full, clear, and exact description, whereby any one skilled in the art can make and use the same.

The object of my invention is to provide a car-fender the action of which shall be automatic and one in which an object shall be removed from the track and pushed to one side without danger of being crowded underneath the fender.

To this end my invention consists in the details of the several parts making up the fender as a whole and in the combination of such parts, as hereinafter described, and more particularly pointed out in the claims.

Figure 1:
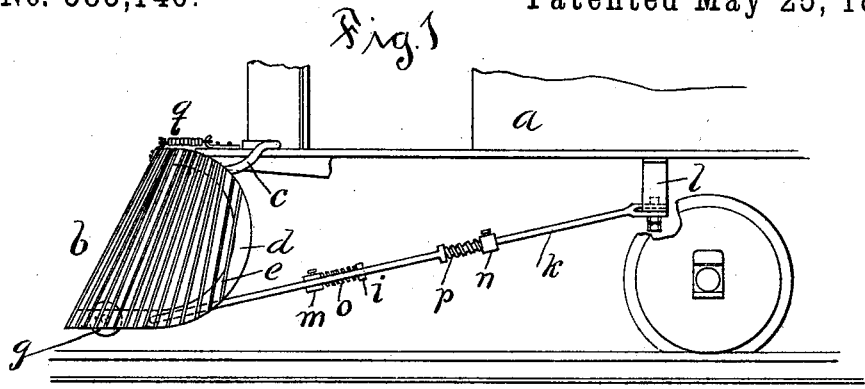
Figure 2:
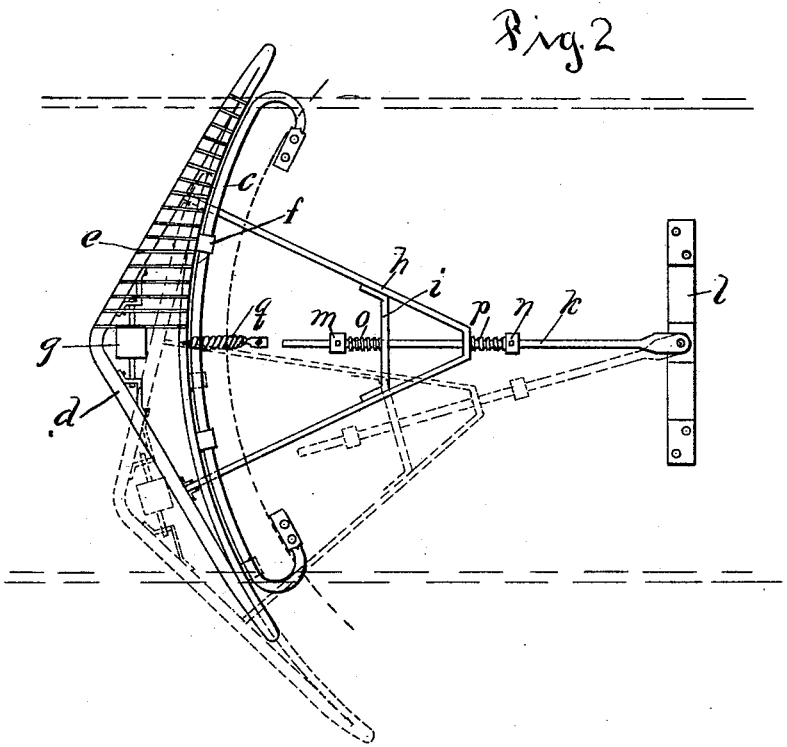

Referring to the drawings, Figure 1 is a view in side elevation of a portion of the forward end of a car, showing my improved fender attached thereto. Fig. 2 is a detail diagram view in plan of the fender, the sidewise position being shown in dotted outline.

In the accompanying drawings the letter $a$ denotes the forward lower portion of a car to which the fender $b$ is attached. A guide-rail $c$ is secured to the forward end of the car and is curved on the arc of a circle. The fender consists of a frame $d$, having vertically-arranged bars $e$, and to the upper end of the fender are secured guides $f$. These guides rest on the guide-rail $c$ and may be provided with any suitable device for permitting free and easy movement on the guide-rail.

To the lower end of the fender is secured a roller $g$, mounted in bearings underneath the frame, the periphery of the roller extending some distance below the lower edge of the fender. A buffer-frame $h$ is secured at its forward end to the lower end of the fender, this frame being preferably of A shape. A cross-piece $i$ connects the two side parts of the frame near the inner end, and a buffer-rod $k$ extends through the inner end of the frame and through the cross-piece, the end of the buffer-rod being pivoted to a bracket $l$, secured to the under side of the car-body.

On the buffer-rod $k$ are adjustably secured collars $m$ $n$, and between these collars and the cross-piece $i$ and the inner end of the buffer-frame, respectively, are interposed springs $o$ $p$. A spring $q$ is located at the upper end of the fender, one end of the spring being secured to the car-body and the opposite end to the fender. The object of this spring is to return the fender to its normal position centrally of the car when for any purpose it shall have been swung to one side.

The operation of the device is as follows: An object being struck by the fender the latter quickly turns to one side, carrying the object with it. In the rocking movement of the car sufficient to cause the fender to be brought near the track the roller $g$ comes in contact with the ground, the fender moving upward against the tension of the spring $o$ on the buffer-rod. The springs $o$ and $p$ afford a cushion to prevent a forcible blow of the fender against the object, the fender yielding when struck and preventing serious injury to the object struck. As soon as the object is removed by being pushed to one side the fender automatically returns to its position centrally of the car under the force of the spring $q$ and to its normal vertical position under the force of the spring $p$.

I claim as my invention—

1. In combination with a car, a guide-rail secured to the car, a fender pivoted on the guide-rail and movable lengthwise thereon, means for holding the fender in a normal central position of the car, a buffer-frame secured to the lower edge of the fender, and the opposite end pivotally connected with a fixed support on the car, and a buffer-spring interposed between the buffer-frame and a part fixed against movement lengthwise of the car.

2. In combination with a car, a guide-rail secured thereto, a fender pivoted to the guide-rail and having a lengthwise movement thereon, means for yieldingly holding the fender in a normal position centrally of the car, a buffer-frame secured at one end to the lower edge of the fender, and its opposite end connected with a buffer-rod, a buffer-rod pivotally connected with the car-body or running-gear and a spring interposed between the buffer-frame and a shoulder on the buffer-rod.

3. In combination with a car, a guide-rail secured thereto, a fender pivoted to the guide-rail and having lengthwise movement thereon, means for yieldingly holding the fender in a normal position centrally of the car, a buffer-frame secured at one end to the lower edge of the fender, and its opposite end connected with the buffer-rod, a buffer-rod pivotally connected with the car-body or running-gear, a spring interposed between the buffer-frame and a shoulder on a buffer-rod and a roller with its periphery projecting below the lower edge of the fender.

4. In combination with a car, a guide-rail secured thereto, a fender pivoted on the guide-rail and movable lengthwise thereof, a spring connected to the upper edge of the fender and the car-body, an A-shaped buffer-frame secured at one end to the lower edge of the fender and having a cross-bar between the side parts, a buffer-rod pivotally connected at one end with the car or running-gear and the opposite end projecting through the end of the buffer-frame and through the cross-bar thereon, a spring interposed between a shoulder on the buffer-rod and the cross-bar, and a spring interposed between the inner end of the buffer-frame and a shoulder on the buffer-rod.

5. In combination with a car, a guide-rail secured thereto, a fender pivoted on the guide-rail, and movable lengthwise thereof, a spring connecting the upper edge of the fender and the car-body, an A-shaped buffer-frame secured at one end to the lower edge of the fender and having a cross-bar between the side parts, a buffer-rod pivotally connected at one end with the car or running-gear and the opposite end projecting through the end of the buffer-frame and through the cross-bar thereof, a spring interposed between a shoulder on the buffer-rod and the cross-bar, and a spring interposed between a shoulder on the buffer-rod and the inner end of the buffer-frame, and a roller secured to and with its periphery projecting below the lower edge of the fender.

6. In combination with a car-body, a guide-rail secured thereto, a fender pivoted thereon and having a movement lengthwise thereof, an A-shaped buffer-frame secured at one end to the lower edge of the fender, a cross-bar extending between the side parts of the buffer-frame, a buffer-rod pivoted at one end to a bracket and the opposite end extending through the end of the buffer-frame and through the cross-bar, the bracket secured to the under part of the car-body, a buffer-spring interposed between the collar on the buffer-rod and the cross-bar, and a collar interposed between the end of the buffer-frame and a collar on the cross-bar.

CHARLES A. HATCH.

Witnesses:
ARTHUR B. JENKINS,
ERMA P. COFFRIN.